United States Patent [19]
Lee

[11] Patent Number: 6,034,940
[45] Date of Patent: Mar. 7, 2000

[54] OPTICAL PICKUP ACTUATOR

[75] Inventor: Kwang-Suk Lee, Seoul, Rep. of Korea

[73] Assignee: Daewoo Electronics Co., Ltd., Seoul, Rep. of Korea

[21] Appl. No.: 09/031,711

[22] Filed: Feb. 27, 1998

[30] Foreign Application Priority Data

Feb. 28, 1997 [KR] Rep. of Korea ......................... 97-6526

[51] Int. Cl.[7] .................................................. G11B 17/00
[52] U.S. Cl. ............................................................ 369/244
[58] Field of Search ..................... 369/244, 219, 369/215, 249, 44.14, 44.15, 44.16, 44.22

[56] References Cited

U.S. PATENT DOCUMENTS

| | | |
|---|---|---|
| 5,103,438 | 4/1992 | Masunaga et al. . |
| 5,182,738 | 1/1993 | Yoshikawa . |
| 5,878,017 | 3/1999 | Ikegame ................................. 369/244 |

*Primary Examiner*—Allen T. Cao
*Attorney, Agent, or Firm*—Pillsbury Madison & Sutro LLP

[57] ABSTRACT

In an optical pickup actuator, a lens holder has an objective lens and a penetrating hole for placing the objective lens. A pair of bobbins make contact with both side surfaces of the lens holder. A focusing coil and a tracking coil are wound around each of the bobbins in orthogonal directions to each other. A bottom plate spaced under the lens holder is installed. A pair of yokes are formed upwardly on the bottom plate at the outsides of the bobbins. A pair of magnets are formed on inside surfaces of the yokes for giving magnetic flux to the focusing and tracking coils. The magnetic flux has an effect only on some coil portion between the bobbin and the magnet, however it has no effect on another coil portion of the bobbin opposite to the magnet. The bobbins serve as internal yokes. A lens holder suspension part has a suspension supporting plate on the bottom plate and a suspension PCB fixed therewith. A pair of coil PCBs are fixed at both side surfaces of the lens holder and connected with both ends of the tracking coil and the focusing coil. The lens holder is floated by suspension wires of which both ends are connected with the suspension PCB and the coil PCBs.

8 Claims, 3 Drawing Sheets

OPTICAL PICKUP ACTUATOR

BACKGROUND OF THE INVENTION

1. Field of the Invention

The present invention relates to an optical pickup actuator. More particularly, the present invention relates to an optical pickup actuator with two bobbins in which a tracking coil and a focusing coil are directly wound around the bobbin.

2. Description of the Prior Arts

Data recording/reproducing apparatuses using optical disks such as a laser disk (LD) and a compact disk (CD) have been commercially available in recent years. In order to read out data from an optical disk, a laser beam is irradiated onto a data recording track (to be referred to as a "track" hereinafter), and data are reproduced based on the beam reflected by the track.

When the tracks are helically formed on the optical disk, since the sectors of a single track are not equidistant from the center of the rotation of the disk, tracking (radial) control is necessary in the read mode to accurately irradiate the track with a laser beam.

This tracking control has been conventionally performed by one beam method or three beam method. Tracking errors are detected from the laser beam reflected by an optical disk. Tracking control operation is conformed by transferring the objective lens in response to the tracking error signals derived by these tracking error signals. The objective lens is normally supported and fixed by a spring on an optical head housing. A tracking actuator is energized to move the lens for the tracking control. When the tracking actuator is deenergized, the lens is held at a mechanically neutral point balanced by a spring force.

Meanwhile, since the distance from the optical pickup to disk shifts minutely in the read mode in which the disk is rotated, it is difficult to correctly read data due to the shift, thus rendering focusing control essential. This focusing control has been conventionally performed by astigmatic method using astigmatism or a knife edge method.

For focusing control, focusing errors are detected from the laser beam reflected by an optical disk, and focusing control operation is conformed by transferring the objective lens in response to the focusing error signals derived by these focusing error signals. The objective lens is normally the same lens that is used for the tracking control. A focusing actuator is energized to move the lens for the focusing control. When the focusing actuator is deenergized, the lens is held at a mechanically neutral point balanced by a spring force.

The conventional optical pickup actuators are generally classified into actuators of two types in arrangement of coils. The objective lens is moved in vertical (focusing) direction and horizontal (tracking) direction using optical pickup actuator. For example, there is one type that focusing and tracking coils are placed in the orthogonal and parallel directions, respectively. There is the other type that the two coils are placed in directions which are 45°/45° against optical axis as in Noiman's cutter head, respectively.

These conventional optical pickup actuators for moving the objective lens in vertical and horizontal directions for focusing and tracking control as shown above are described in U.S. Pat. No. 5,103,438 (issued to Masunaga et al.), U.S. Pat. No. 5,182,738 (issued to Yoshigawa), etc.

As shown in FIGS. 1 and 2, two suspension wires 2 extend in parallel with each other in a horizontal direction. One end of each of the suspension wires 2 is connected to an upstanding wall portion of an actuator base 1. Further, a holder 4 is positioned above the actuator base 1 for supporting an objective lens 3, and the holder 4 is connected to each end of the suspension wires 2. Therefore, the holder 4 is movably supported on the suspension wires 2 in a cantilevered fashion.

Magnets 5A and 5B are fixed to the holder 4. Further, focusing coils 7A and 7B and tracking coils 8A and 8B are mounted on yokes 6A and 6B which stand vertically from the actuator base 1. One magnet 5A confronts the focusing coil 7A and tracking coil 8A, and the other magnet 5B confronts the focusing coil 7B and tracking coil 8B. The combination of holder 4, the coils 7, 8, the magnets 5, and suspension wires 2 is generally referred to as an actuator.

With such an actuator, the suspension wires 2 are formed of extremely flexible materials having low elastic modulus so as to insure precise movement of the holder 4 in response to the magnetic forces. Stated differently, in the conventional actuator, a sufficiently high magnetic flux density has not been obtainable, and therefore, the suspension wires 2 have required extremely high flexibility so that the wires 2 do not restrain movement of the holder 4 in response to the generated magnetic attractive force.

According to the optical pickup actuator having the wire type suspension, the laser beam generated from the laser diode is incident on the recording pit, and the laser reflected from the recording pit is received on the photo detector. As a consequence, information recorded on the recording pit is read out. The tracking and focusing conditions on the recording pit are detected by the laser beam reflected from the recording pit.

When focusing control is required, a current is supplied to the focusing coils 7A and 7B in clockwise and counterclockwise directions. At that time, electromagnetic force acts in a direction of the support shaft 6 (focusing direction X). Accordingly, the objective lens is axially moved to correspond with a change in surface level of the optical disc, so that the beam spot follows the recording surface of the disc.

When tracking control is required, a current is supplied to the tracking coils 8A and 8B in one direction or in the reverse direction thereof. At that time, electromagnetic force acts in an orthogonal direction with the support shaft (tracking direction Y). Accordingly, the beam spot traces the recording tracks in accordance with eccentricity of the tracks.

Thus, the predetermined currents flow into focusing and tracking coils, which are respectively move the holder 4 in the focusing direction X or the tracking direction Y. As a result, the focusing and tracking servos are carried out.

According to the optical pickup actuator, during the tracking servo, the lens holder connected with the suspension wires may be moved in the tracking direction. At this time, since the distances between lens holder and both tracking coils are different from each other, the forces applied to the lens holder by both tracking coils are minutely different from each other. Thereby, minute malfunction generates in the tracking servo.

Furthermore, since the lens holder of actuator is provided with a magnet fixed at side faces thereof, the suspension wires have to be formed from a material capable of bearing a heavy weight. Therefore, it requires the larger force during tracking or focusing controls, and it makes difficult minute controlling.

During the manufacture of the optical pickup actuator, the tracking coils are temporarily installed on the sides of the winding focusing coils. The function of the tracking coils is checked under the temporarily fixed state, and then the appropriate positions of the tracking coils are determined to be adhered and fixed at the positions.

SUMMARY OF THE INVENTION

The present invention is intended to overcome the above-mentioned and numerous other disadvantages and deficiencies of the prior art. Therefore, it is an object of the present invention to provide an optical pickup actuator having a lens holder and bobbins contacted therewith in which a tracking coil and a focusing coil are directly wound around the bobbin in orthogonal directions to each other for simplification of construction and manufacturing process.

It is another object of the present invention to an optical pickup actuator in which the weight of lens holder which is operated in the tracking and focusing directions is reduced for superior sensitivity in the tracking and focusing servos.

Furthermore, it is another object of the present invention to an optical pickup actuator in which a shape of yokes is simplified for simplification of construction and manufacturing process and compactization in size.

To achieve the above objects of the present invention, there is provided an optical pickup actuator which comprises:

a lens holder having an objective lens for focusing a laser beam on a recording surface of an optical recording medium and a penetrating hole for placing the objective lens;

a pair of bobbins for being contacted with both side surfaces of the lens holder, each of the bobbins having a focusing coil and a tracking coil, the tracking coil and the focusing coil being directly wound around a body of the bobbin in orthogonal directions to each other, and a winding axis of the focusing coil being parallel with an optical axial direction of the objective lens;

magnet keeping means having a bottom plate spaced under the lens holder, yokes formed upwardly on the bottom plate and formed at corresponding positions of both outsides of the bobbins, magnets formed on inside surfaces of the yokes for giving magnetic flux to the focusing coil and the tracking coil in order to move the lens holder; and lens holder suspension means for floating the lens holder, lens holder suspension means having a suspension supporting plate formed upwardly on the bottom plate under the lens holder, suspension PCB fixed at the suspension supporting plate, a pair of coil PCBs fixed at both of the other side surfaces of the lens holder and connected with both ends of the tracking coil and the focusing coil, and suspension wires for floating the lens holder from the suspension supporting plate, the suspension wires having both ends connected with suspension PCB and coil PCBs.

According to the present invention, the optical pickup actuator has a lens holder and bobbins contacted therewith in which a tracking coil and a focusing coil are directly wound around each of the bobbins in orthogonal directions to each other, and therefore construction and manufacturing process of the coil part are very simplified.

The effective range of the magnetic flux of the magnet for the tracking coil is sharply increased, and therefore a generating ratio of the electromagnetic force to the electric current in the tracking coil is sharply increased during the tracking servo.

Moreover, during the focusing and tracking servo, the magnetic flux of the magnet does not reach the coil part of the opposite side to the magnet centering on the bobbin, whereby the bobbin serves as an internal yoke, and therefore special internal yokes are not required to be formed. Thus, construction of the optical pickup actuator is simplified and compactized.

BRIEF DESCRIPTION OF THE DRAWINGS

The present invention may be better understood and its numerous objects and advantages will be more apparent to those skilled in the art by reference to the accompanying drawings in which.

DESCRIPTION OF THE PREFERRED EMBODIMENTS

Hereinafter, the preferred embodiments of this invention will be described in detail with reference to the accompanying drawings.

Figure 1:
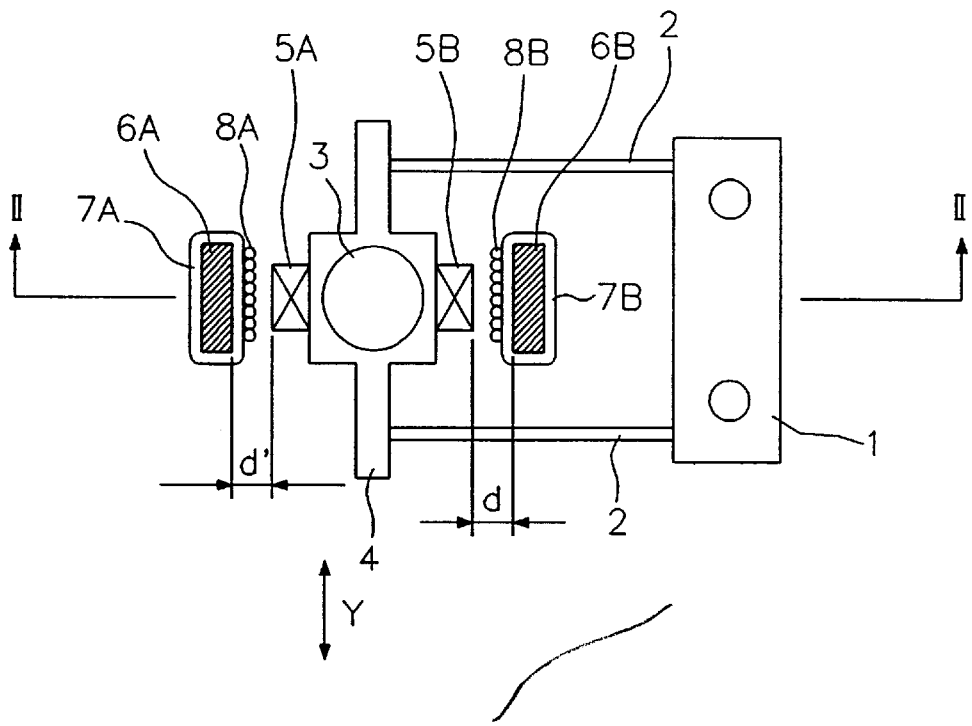
FIG. 1 is a plan view for showing a conventional optical pickup actuator.
Figure 2:
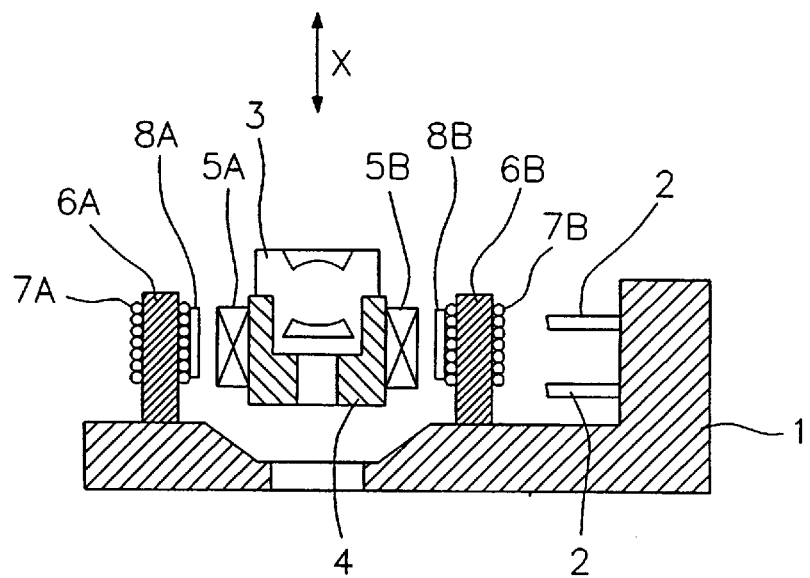
FIG. 2 is a cross-sectional view taken along the line II—II of FIG. 1.
Figure 3:
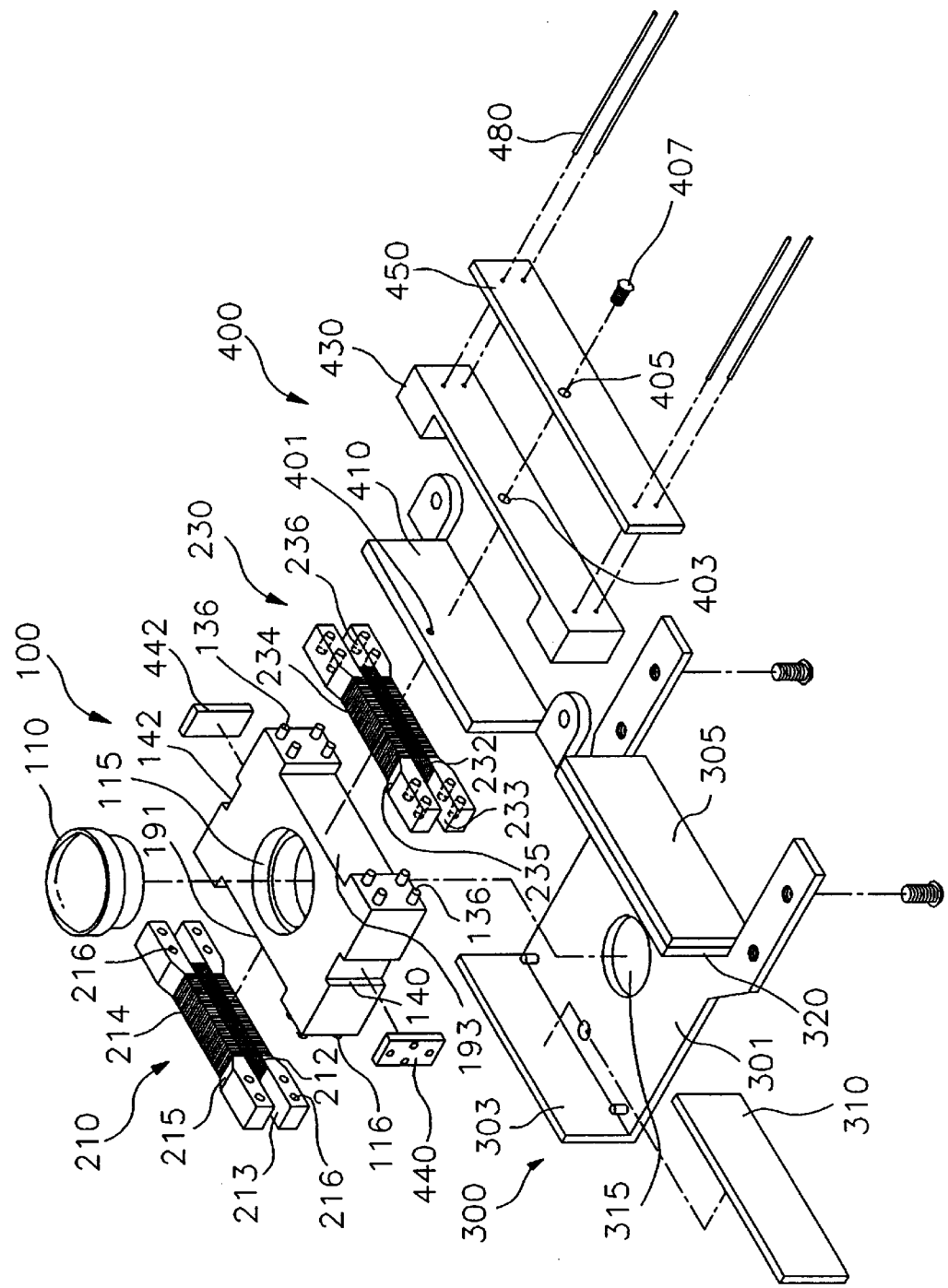
FIG. 3 is an exploded perspective view for showing the optical pickup actuator of the present invention.
Figure 4:
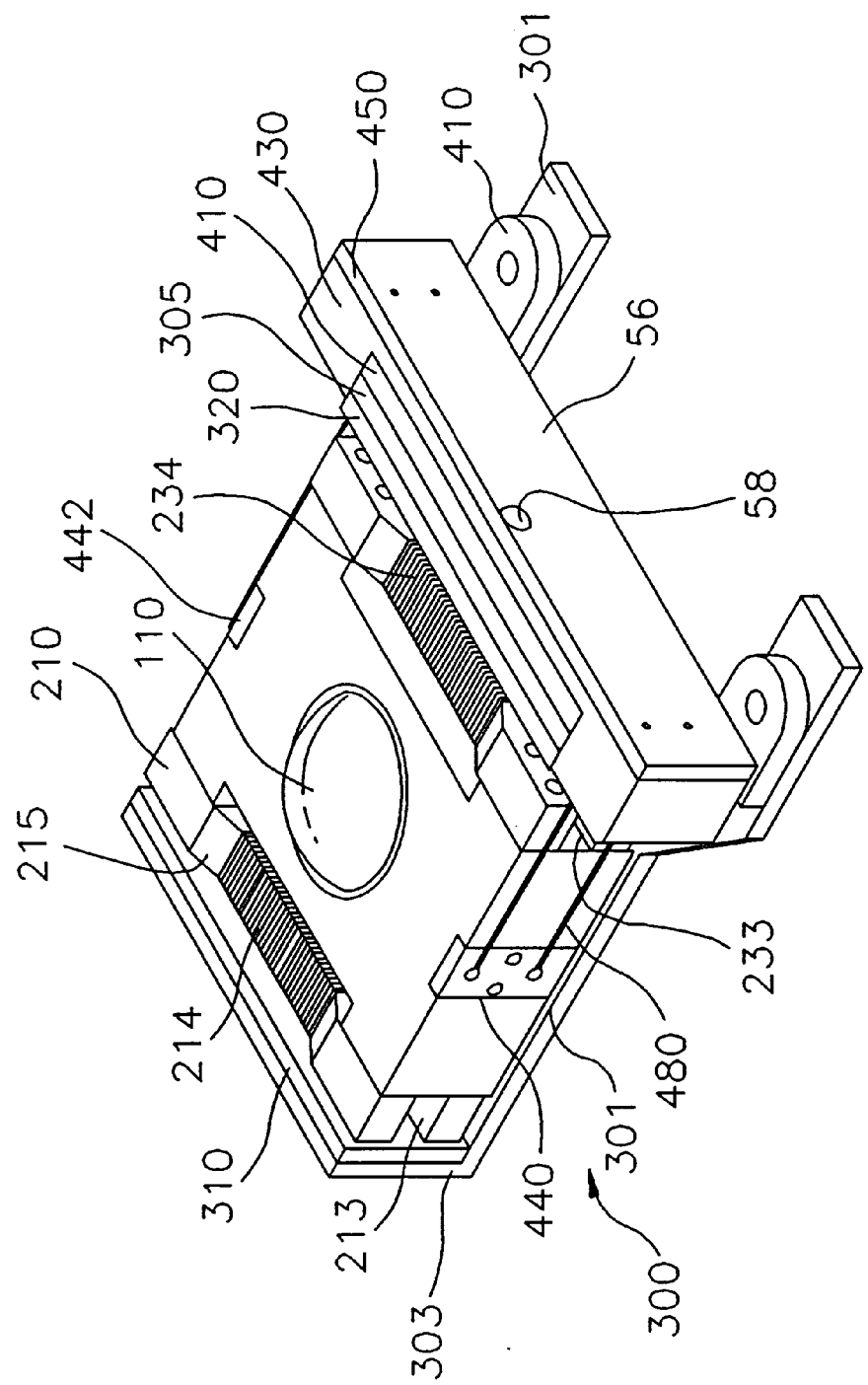
FIG. 4 is a perspective view for showing the optical pickup actuator of FIG. 3.

FIG. 3 is an exploded perspective view for showing the optical pickup actuator of the present invention, and FIG. 4 is a perspective view for showing the optical pickup actuator of FIG. 3.

A lens holder 100 is formed with a rectangular shape. The lens holder 100 has a penetrating hole 115 penetrating up and down the lens holder 100. An objective lens 110 is placed in the penetrating hole 115 for focusing a laser beam on a recording surface of an optical recording medium. The lens holder 100 of the rectangular shape has first recesses 140, 142 formed on both opposite side surfaces of the lens holder 100 for inserting coil PCBs 440, 442.

A pair of bobbins 210, 230 are contacted with both of the other opposite side surfaces of the lens holder 100. Focusing coils 212, 232 are respectively wound around bodies of the bobbins 210, 230 with a winding axis of the optical axial direction of the objective lens 110. Bobbins 210, 230 are provided with first step parts for stopping focusing coil 213, 233 so that the focusing coils 212, 232 can be stably wound without slipping around the bobbins 210, 230. Tracking coils 214, 234 are respectively wound around bodies of the bobbins 210, 230 with a winding axis of the orthogonal direction to the optical axis of the objective lens 110. Bobbins 210, 230 are provided with second step parts for stopping tracking coils 215, 235 so that the tracking coils 214, 234 can be stably wound without slipping around the bobbins 210, 230.

To bring the lens holder into detachable contact with the bobbins, the lens holder 100 has a plurality of projectors 116, 136 formed on the side surfaces contacted with bobbins 210, 230. Bobbins 210, 230 respectively have inserting holes 216, 236 formed on the surfaces contacted with the lens holder 100 at the corresponding positions with the projectors 116, 136 of the lens holder 100. Furthermore, lens holder 100 has second recesses 191, 193 formed on both side surfaces contacted with bobbins 210, 230. Thereby, when lens holder 100 makes contact with the bobbins 210, 230, tracking coils 214, 234 and focusing coils 212, 232 wound around bobbins 210, 230 do not touch lens holder 100.

A magnet keeping part 300 is installed spaced apart from lens holder 100. The magnet keeping part 300 has a bottom plate 301 spaced apart from lens holder 110 under lens holder 110. The bottom plate 301 has a penetrating hole 315 coaxial with the objective lens 110 of lens holder 100. Laser beam is focused on an optical disc via penetrating hole 315 and objective lens 110. A pair of yokes 303, 305 are extended upwardly from bottom plate 301 at outsides of bobbins 210, 230, respectively. A pair of magnets 310, 320 are fixed at the inner surfaces of the yokes 303, 305. Both of the bobbins 210, 230 connected with lens holder 100 are respectively spaced from both of the magnets 310, 320 to allow free movement for tracking and focusing servos.

Reference numeral 400 denotes a lens holder suspension part. A suspension supporting plate 410 is installed at the outer side part of one yoke 305 of yokes 303, 305. The suspension supporting plate 410 is displaced uprightly on the bottom plate 301 at the outer side part of one yoke 305. A gel holder 430 filled with damping gel is installed at the outer side part of suspension supporting plate 410. A suspension PCB 450 is installed at the outer side part of a gel holder 430. Suspension supporting plate 410, gel holder 430, and suspension PCB 450 are stuck together with one another by a screw 407 via the respective penetrating holes 401, 403, 405. A pair of coil PCBs 140, 142 are fixed at the first recesses 140, 142 of both of the side surfaces of the lens holder 100, and connected with both ends of the tracking coils 214, 234 and the focusing coils 212, 232. One end of each suspension wire 480 is connected with suspension PCB 450 and the other end is connected with coil PCBs 140, 142, and thus floats the lens holder 100 from the suspension supporting plate 410. The electric currents for focusing and tracking applied to suspension PCB 450 from signal processing part (not shown) travel to the focusing coils 212, 232 and the tracking coils 214, 234 via suspension wires 480 and coil PCBs 140, 142. Also, gel holder 430 is filled with gel of high viscosity, so that any negative resonance of the suspension wires can be rapidly decreased.

Hereinafter, an operation of the optical pickup of the present invention will be described.

In a reproducing operation of the disc player by means of the optical pickup actuator, laser beam irradiated from the laser light source is focused on the recording surface of the optical disc via the objective lens, and thereby information in the disc is reproduced and the tracking and focusing errors are detected.

If the tracking and focusing errors are detected, the electric currents for focusing and tracking are applied to suspension PCB 450 from signal processing part (not shown). The currents are applied to coil PCBs 140, 142 via suspension wires 480. The currents travel to the focusing coils 212, 232 and the tracking coils 214, 234 wound around bobbins 210, 230.

The electric currents flowing in the focusing coils 212, 232 and the tracking coils 214, 234 and the magnetic flux of the magnets 310, 320 fixed by the yokes 303, 305 and placed at the outer part of the bobbins 210, 230 generate the electromagnetic force for moving the lens holder 100 in the tracking and focusing directions.

When a focusing error is generated, electric current flows in the focusing coils 212, 232 wound around bobbins 210, 230. At this time, only on some coil portion of the focusing coils 212, 232 between the bobbins 210, 230 and magnets 310, 320, the electromagnetic force for moving the lens holder 100 in the optical axial direction is generated. However, on another coil part of focusing coils 212, 232 opposite to magnets 310, 320, the magnetic flux of the magnet has no effect because the bobbins 210, 230 serve as internal yokes, and thus no electromagnetic force is generated. Accordingly, the electric currents flowing in the focusing coils 212, 232 wound around bobbins 210, 230 generate the electromagnetic force for moving the lens holder 100 in the optical axial direction (focusing direction), and thereby the focusing servo is carried out.

Similarly, when a tracking error is generated, electric current flows in the tracking coils 214, 234 wound around bobbins 210, 230. At this time, only on some coil portion of the tracking coils 214, 234 between the bobbins 210, 230 and magnets 310, 320, the electromagnetic force for moving the lens holder 100 in the radial direction of the disc is generated. However, on another coil part of tracking coils 214, 234 opposite to magnets 310, 320, the magnetic flux of the magnet has no effect because the bobbins 210, 230 serve as internal yokes, and thus no electromagnetic force is generated. Accordingly, the electric currents flowing in the tracking coils 214, 234 wound around bobbins 210, 230 generate the electromagnetic force for moving the lens holder 100 in the radial direction of the disc (tracking direction), and thereby the tracking servo is carried out. Thus, due to the above mentioned focusing and tracking servos, errors for focusing of the laser beam can be precisely amended, and thereby information in the disc can be accurately reproduced.

According to the present invention, the optical pickup actuator has a lens holder and bobbins contacted therewith in which a tracking coil and a focusing coil are directly wound around each of the bobbin in orthogonal directions to each other, and therefore construction and manufacturing process of the coil part are very simplified.

The effective range of the magnetic flux of the magnet for the tracking coil is sharply increased, and therefore a generating ratio of the electromagnetic force to the electric current in the tracking coil is sharply increased during the tracking servo.

Moreover, during the focusing and tracking servo, the magnetic flux of the magnet does not reach the coil part of the opposite side to the magnet centering on the bobbin, whereby the bobbin serves as an internal yoke, and therefore special internal yokes are not required to be formed. Thus, construction of the optical pickup actuator is simplified and compactized.

It is understood that various other modifications will be apparent to and can be readily made by those skilled in the art without departing from the scope and spirit of this invention. Accordingly, it is not intended that the scope of the claims appended thereto be limited to the description as set forth herein, but rather that the claims be constructed as encompassing all the features of patentable novelty that reside in the present invention, including all features that would be treated as equivalents thereof by those skilled in the art to which this invention pertains.

What is claimed is:

1. An optical pickup actuator which comprises:
   a lens holder having an objective lens for focusing a laser beam on a recording surface of an optical recording medium and a penetrating hole for placing the objective lens;
   a pair of bobbins for being contacted with both side surfaces of the lens holder, each of the bobbins having a focusing coil and a tracking coil, the tracking coil and the focusing coil being directly wound around a body of each of the bobbins in orthogonal directions to each other, and a winding axis of the focusing coil being parallel with an optical axial direction of the objective lens;

magnet keeping means having a bottom plate spaced under the lens holder, a pair of yokes formed upwardly on the bottom plate and formed at corresponding positions of outsides of both of the bobbins, a pair of magnets formed on inside surfaces of the yokes for giving magnetic flux to the focusing coil and the tracking coil in order to move the lens holder; and lens holder suspension means for floating the lens holder, the lens holder suspension means having a suspension supporting plate formed upwardly on the bottom plate under the lens holder, a the suspension PCB fixed at the suspension supporting plate, a pair of coil PCBs fixed at both of the other side surfaces of the lens holder and connected with both ends of the tracking coil and the focusing coil, and suspension wires for floating the lens holder from the suspension supporting plate, the suspension wires having both ends connected with suspension PCB and coil PCBs.

2. The optical pickup actuator as claimed in claim 1, wherein each of the bobbins winding the tracking coil and the focusing coil is so determined that magnetic flux of the magnet has an effect only on some coil portion between the bobbin and the magnet, while magnetic flux of the magnet has no effect on another coil part of the bobbin opposite to the magnet.

3. The optical pickup actuator as claimed in claim 1, wherein each bobbin is provided with first step parts for stopping the focusing coil so that the focusing coil is stably wound without slipping around the bobbin.

4. The optical pickup actuator as claimed in claim 1, wherein each bobbin is provided with second step parts for stopping the tracking coil so that the tracking coil is stably wound without slipping around the bobbin.

5. The optical pickup actuator as claimed in claim 1, wherein the lens holder and the bobbins respectively have a plurality of projectors and inserting holes which are formed at the corresponding positions with each other on the contacting surfaces of the lens holder and the bobbins in order to bring the lens holder into detachable contact with the bobbins.

6. The optical pickup actuator as claimed in claim 1, wherein the lens holder has second recesses formed on both side surfaces contacted with the bobbins so that when lens holder makes contact with the bobbins, tracking coils and focusing coils wound around bobbins do not touch lens holder.

7. The optical pickup actuator as claimed in claim 1, wherein a gel holder is installed between the suspension PCB and the suspension supporting plate, the suspension supporting plate, the gel holder, and the suspension PCB are stuck together with one another, and gel holder is filled with gel of high viscosity and the suspension wires connected with the suspension PCB are penetrating through the gel holder so that any negative resonance of the suspension wires can be rapidly decreased.

8. An optical pickup actuator which comprises:
a lens holder having an objective lens for focusing a laser beam on a recording surface of an optical recording medium and a penetrating hole for placing the objective lens;

a pair of bobbins for being contacted with both side surfaces of the lens holder, each of the bobbins having a focusing coil and a tracking coil, the tracking coil and the focusing coil being directly wound around a body of each of the bobbins in orthogonal directions to each other, and a winding axis of the focusing coil being parallel with an optical axial direction of the objective lens, each of the bobbins being provided with first step parts for stopping the focusing coil so that the focusing coil is stably wound without slipping around the bobbin and second step parts for stopping tracking coil so that the tracking coil is stably wound without slipping around the bobbin;

magnet keeping means having a bottom plate spaced under the lens holder, a pair of yokes formed upwardly on the bottom plate and formed at corresponding positions of outsides of both of the bobbins, a pair of magnets formed on inside surfaces of the yokes for giving magnetic flux to the focusing coil and the tracking coil magnetic flux in order to operate the lens holder; and lens holder suspension means for floating the lens holder, the lens holder suspension means having a suspension supporting plate formed upwardly on the bottom plate under the lens holder, a suspension PCB fixed at the suspension supporting plate, a pair of coil PCBs fixed at both of the other side surfaces of the lens holder and connected with both ends of the tracking coil and the focusing coil, and suspension wires for floating the lens holder from the suspension supporting plate, the suspension wires having both ends connected with the suspension PCB and coil PCBs, wherein the lens holder and the bobbins respectively have a plurality of projectors and inserting holes which are formed at the corresponding positions with each other on the contacting surfaces of the lens holder and the bobbins in order to bring the lens holder into detachable contact with the bobbins, and the bobbin which the tracking coil and the focusing coil are wound is so determined that magnetic flux of the magnet has an effect only on some coil portion between the bobbin and the magnet, while magnetic flux of the magnet has no effect on another coil part of the bobbin opposite to the magnet.

* * * * *